(12) United States Patent
Chen

(10) Patent No.: US 11,819,996 B2
(45) Date of Patent: Nov. 21, 2023

(54) EXPRESSION FEEDBACK METHOD AND SMART ROBOT

(71) Applicant: YUTOU TECHNOLOGY (HANGZHOU) CO., LTD., Hangzhou (CN)

(72) Inventor: Mingxiu Chen, Hangzhou (CN)

(73) Assignee: YUTOU TECHNOLOGY (HANGZHOU) CO., LTD., Zhejiang (CN)

( * ) Notice: Subject to any disclaimer, the term of this patent is extended or adjusted under 35 U.S.C. 154(b) by 715 days.

(21) Appl. No.: 15/999,762

(22) PCT Filed: Feb. 20, 2017

(86) PCT No.: PCT/CN2017/074054
§ 371 (c)(1),
(2) Date: Jun. 7, 2021

(87) PCT Pub. No.: WO2017/143951
PCT Pub. Date: Aug. 31, 2017

(65) Prior Publication Data
US 2021/0291380 A1 Sep. 23, 2021

(30) Foreign Application Priority Data
Feb. 23, 2016 (CN) .......................... 201610099484.9

(51) Int. Cl.
*B25J 9/16* (2006.01)
*B25J 11/00* (2006.01)

(52) U.S. Cl.
CPC ........... *B25J 11/0005* (2013.01); *B25J 9/163* (2013.01); *B25J 9/1653* (2013.01); *B25J 9/1697* (2013.01); *B25J 11/001* (2013.01); *B25J 11/0015* (2013.01)

(58) Field of Classification Search
CPC ..... G16Z 99/00; B25J 11/0015; B25J 9/1602; G06N 3/008; G05B 2219/39254;
(Continued)

(56) References Cited

U.S. PATENT DOCUMENTS

| | | | |
|---|---|---|---|
| 6,718,232 B2 * | 4/2004 | Fujita | G06N 3/008 701/472 |
| 6,862,497 B2 * | 3/2005 | Kemp | G05B 13/0265 700/86 |

(Continued)

FOREIGN PATENT DOCUMENTS

| | | |
|---|---|---|
| CN | 101877056 | 11/2010 |
| CN | 103488293 | 1/2014 |

(Continued)

OTHER PUBLICATIONS

Erol et al., Toward Artificial Emotional Intelligence for Cooperative Social Human—Machine Interaction, 2019, IEEE, p. 234-246 ( Year: 2019).*

(Continued)

*Primary Examiner* — McDieunel Marc
(74) *Attorney, Agent, or Firm* — Andrew F. Young; NOLTE LACKENBACH SIEGEL

(57) ABSTRACT

An expression feedback method and a smart robot, belonging to smart devices. The method comprises: step S1, a smart robot using an image collection apparatus to collect image information; step S2, the smart robot detecting whether human face information representing a human face exists in the image information; if so, acquiring position information and size information associated with the human face information, and then turning to step S3; and if not, returning to step S1; step S3, according to the position information and the size information, obtaining, by prediction, a plurality of pieces of feature point information in the human face information and outputting same; and step S4, using a first (Continued)

identification model formed through pre-training, determining whether the human face information represents a smiling face according to the feature point information, and then exiting from this step; if so, the smart robot outputting preset expression feedback information; and if not, exiting from this step. The beneficial effect of the method is: enriching an information interaction content between a smart robot and a user, so as to improve usage experience of the user.

12 Claims, 2 Drawing Sheets

(58) Field of Classification Search
CPC ........... G05B 2219/35453; G05B 2219/33053; G05B 2219/33056
See application file for complete search history.

(56) References Cited

U.S. PATENT DOCUMENTS

| | | | | |
|---|---|---|---|---|
| 7,113,848 | B2* | 9/2006 | Hanson | G16Z 99/00 |
| | | | | 700/258 |
| 8,848,068 | B2* | 9/2014 | Pfister | G06V 40/176 |
| | | | | 382/209 |
| 9,984,098 | B2* | 5/2018 | Shochat | G06V 40/173 |
| 11,158,403 | B1* | 10/2021 | Sapiro | G16H 40/60 |
| 11,455,828 | B2* | 9/2022 | Ito | G06V 10/776 |
| 2022/0270404 | A1* | 8/2022 | Cyrus | G06V 10/82 |

FOREIGN PATENT DOCUMENTS

| | | |
|---|---|---|
| CN | 103679203 | 3/2014 |
| CN | 104102346 | 10/2014 |

OTHER PUBLICATIONS

Chumkamon et al., The robot's eye expression for imitating human facial expression, 2014, IEEE, p. 1-5 (Year: 2014).*
Liu et al., A multimodal emotional communication based humans-robots interaction system, 2016, IEEE, p. 6363-6368 (Year: 2016).*
Botzheim et al., Gestural and facial communication with smart phone based robot partner using emotional model, 2014, IEEE, pg. (Year: 2014).*
PCT/CN2017/074054, Search Report and Written Opinion, dated May 22, 2017, 7 pages_Chinese, 8 pages—English.

* cited by examiner

Step S41: all the information of the feature points predicted in Step S3 are input into the first recognition model; ← S41

Step S42: the first recognition model is used to determine if the face information represents a smiling face: ← S42

Y/N —NO→ Exit

YES ↓

The intelligent robot will output preset facial expression response information.

Figure 2

EXPRESSION FEEDBACK METHOD AND SMART ROBOT

CROSS-REFERENCE TO RELATED APPLICATIONS

The present application claims priority to and the benefit of Ser. No. PCT/CN2017/074054 filed Feb. 20, 2017, which in turn claims priority to and the benefit of Chinese Patent Application No. CN 201610099484.9 filed on Feb. 23, 2016.

FIELD OF THE INVENTION

The present invention relates to the technical field of the intelligent device, especially to an intelligent robot and a method for response to facial expression.

DESCRIPTION OF THE RELATED ART

With the rapid development of technology of R&D and manufacture of intelligent devices, an intelligent robot, one special intelligent device, begins to enter people's daily lives. The intelligent robot is actually a multifunctional intelligent device, which is equivalent to an intelligent device integrated with different functions in other different intelligent devices. For example, an intelligent robot may be integrated with audio playing function of an audio playing device, video playing function of a video playing device, voice conversation function of an intelligent voice device, and many other functions.

In the prior art, an intelligent robot could make a response to information input by a user, in other words, the intelligent robot could perform simple information interaction with the user. However, a response message for the user sent by the intelligent robot is usually apathy, that is, it cannot respond differently, according to different emotion of the user when he/she enters information. As a result, contents in information interaction between the user and the intelligent robot are rigid, thereby reducing usage experience of the user.

SUMMARY OF THE INVENTION

Aiming at the abovementioned technical problems, the invention provides technical solutions of a method for response to facial expression and an intelligent robot. The technical solutions are intended to enrich contents in information interaction between the user and the intelligent robot, so as to improve the usage experience of the user.

The technical solutions specifically comprise:

A method for response to facial expression, applicable to intelligent robots, which are configured with image capture devices; the method comprising:

Step S1: the intelligent robot uses the image capture device to capture image information;

Step S2: the intelligent robot detects if any face information representing human face exists within the image information;

if the result shows "YES", location information and size information associated with the face information will be obtained, then proceeding to Step S3;

if the result shows "NO", returning to Step S1;

Step S3: according to the location information and the size information, information of a plurality of feature points in the face information are predicted and are output;

the information of the plurality of feature points are respectively associated with various parts of the human face represented by the face information; and Step S4: the intelligent robot determines if the face information represents a smiling face according to the information of feature points by using a first recognition model formed in an advance training, and exits:

if the result shows "YES", the intelligent robot will output preset facial expression response information, and exit;

if the result shows "NO", it will exit.

Preferably, the method for response to facial expression, wherein a second recognition model for detecting the face information is formed in the intelligent robot in an advance training;

and Step S2 specifically comprises:

the intelligent robot uses the second recognition model to detect if the face information exists within the image information;

if the result shows "YES", location information and size information associated with the face information will be obtained, then proceeding to Step S3;

if the result shows "NO", returning to Step S1.

Preferably, the method for response to facial expression, wherein a third recognition model for predicting the information of feature points is formed in the intelligent robot in an advance training;

and Step S3 specifically comprises:

the intelligent robot uses the third recognition model to predict the information of a plurality of feature points in the face information and output the information of plurality of feature points, according to the location information and the size information.

Preferably, the method for response to facial expression, wherein in Step S3, the third recognition model is used to obtain information of the 68 feature points associated with the face information by way of predication.

Preferably, the method for response to facial expression, wherein Step S4 specifically comprises:

Step S41: all the information of the feature points predicted in Step S3 are input into the first recognition model;

Step S42: the first recognition model is used to determine if the face information represents a smiling face:

if the result shows "YES", the intelligent robot will output preset facial expression response information;

if the result shows "NO", it will exit.

Preferably, the method for response to facial expression, wherein the facial expression response information in Step S4 comprises:

a preset emoticon for expressing happy mood, which is displayed through a display device of the intelligent robot; and/or a preset voice for expressing happy mood, which is played by a voice playing device of the intelligent robot.

An intelligent robot, using the abovementioned method for response to facial expression.

The advantageous effects of the invention includes; a method for response to facial expression is provided, which could enrich contents in information interaction between the user and the intelligent robot, so as to improve the usage experience of the user.

BRIEF DESCRIPTIONS OF THE DRAWINGS

The accompanying drawings, together with the specification, illustrate exemplary embodiments of the present disclosure, and, together with the description, serve to explain the principles of the present invention.

FIG. 2 is a flow diagram of recognizing facial expression based on FIG. 1, according to a preferred embodiment of the invention.

DETAILED DESCRIPTIONS

Figure 1:
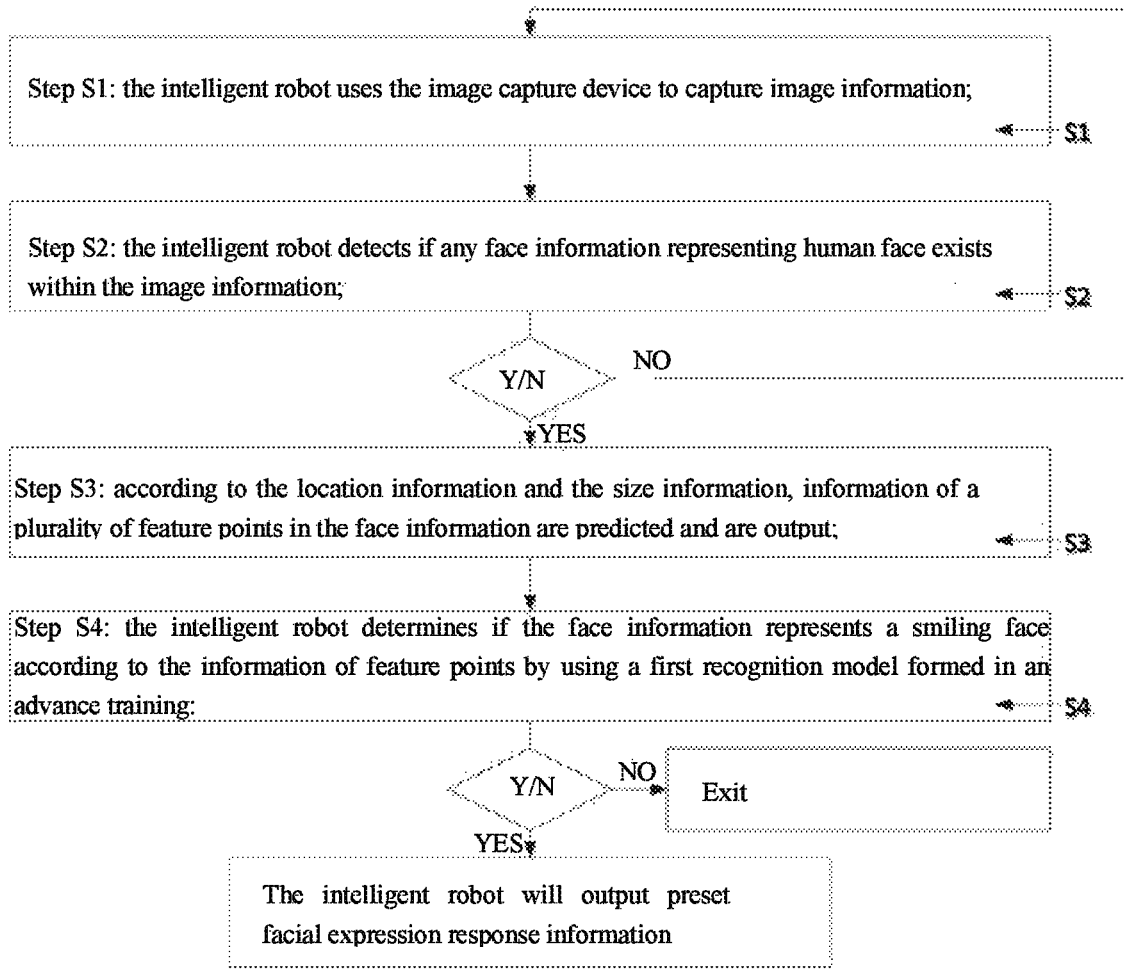
FIG. 1 is an overall flow diagram of the method for response to facial expression according to a preferred embodiment of the invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure w % ill be described with reference to the accompanying drawings.

In a preferred embodiment of the invention, aiming at solving the abovementioned technical problems in the art, a method for response to facial expression is provided for intelligent robots. The specific steps of the method are shown in FIG. 1, comprising:

Step S1: the intelligent robot uses the image capture device to capture image information;

Step S2: the intelligent robot detects if any face information representing human face exists within the image information:

if the result shows "YES", location information and size information associated with the face information will be obtained, then proceeding to Step S3;

if the result shows "NO", returning to Step S1;

Step S3: according to the location information and the size information, information of a plurality of feature points in the face information are predicted and are output;

S4: the intelligent robot determines if the face information represents a smiling face according to the information of feature points by using a first recognition model formed in an advance training:

if the result shows "YES", the intelligent robot will output preset facial expression response information, and exit;

if the result shows "NO", it will exit.

In a specific embodiment, the intelligent robot utilizes the way of facial recognition to confirm which kind of facial expression information it should respond to. Specifically, the user needs to stand in a collection area, such as an area in front, of the image capture device (namely a camera) of the intelligent robot.

In this embodiment, firstly, the intelligent robot uses the image capture device to capture image information in the collection area, then it determines if any face information exists within the image information; if the face information exists, the face information will be received, and both location information and size information of the face information will be extracted. In detail, the location information means the specific location of the face information in the viewfinder frame of the image capture device; the size information means the size of the face represented by the face information.

In this embodiment, after the face information and its location information and size information are obtained, information of a plurality of feature points in the face information could be predicted according to the location information and the size information. Specifically, the information of the plurality of feature points are respectively associated with various parts of the human face represented by the face information; for example, information of different feature points are respectively associated with eyebrows, eyes, a nose, a mouth, a facial contour and other parts on the human face represented by the face information.

In this embodiment, after information the plurality of feature points is predicted, it is determined if a face shown in the face information represents a smiling face according to the information of all feature points by using a first recognition model formed in an advance training: if the results show "YES", the intelligent robot will output preset facial expression response information based on this smiling face; if the results show "NO", it will exit directly. Furthermore, if the face information does not represent the smiling face, the intelligent robot will output other response information according to a preset strategy, and this process is not included in the technical solutions of the present invention, so it is not described in detail.

In a preferred embodiment of the present invention, a second recognition model for detecting the face information is formed in the intelligent robot in an advance training;

and Step S2 specifically comprises:

the intelligent robot uses the second recognition model to detect if the face information exists within the image information;

if the result shows "YES", location information and size information associated with the face information will be obtained, then proceeding to Step S3;
if the result shows "NO", returning to Step S1.

Specifically, in a preferred embodiment of the present invention, the second recognition model is formed in the intelligent robot in an advance training by inputting a plurality of different training samples, and the second recognition model is a human face detector, which could be used to determine if the face information exists within the image information collected by the image capture device. In the prior art, existing techniques have provided many technical solutions for forming the human face detector in a training, thus, it is not necessary to give details herein.

In a preferred embodiment of the present invention, a third recognition model for predicting the information of feature points is formed in the intelligent robot in an advance training:

and Step S3 specifically comprises:
the intelligent robot uses the third recognition model to predict the information of a plurality of feature points in the face information and output the information of plurality of feature points, according to the location information and the size information.

Specifically, in a preferred embodiment of the present invention, similarly, the third recognition model for predicting the information of a plurality of feature points in the face information is formed in the intelligent robot in an advance training by inputting a plurality of different training samples. In other words, the third recognition model is a feature point predicting model. The third recognition model could be used for predicting the information of the plurality of feature points in the face information according to the face information and its location information and size information. In a preferred embodiment of the present invention, the third recognition model is used to predict information of the 68 feature points from the face information. These pieces of information of the feature points relate to various parts of the human face, which include but not limited to the eyebrows, the eyes, the nose, the mouth, the facial contour and other parts on the human face. In other words, information of the 68 feature points predicted from the face information by the third recognition model may be used to represent information of various parts in the face information respectively. Based on recognition processing of the third recognition model, the predicted information of the 68 feature points are output.

As shown in FIG. 2, in a preferred embodiment of the present invention, Step S4 specifically comprises:
Step S41: all the information of the feature points predicted in Step S3 are input into the first recognition model;
Step S42: the first recognition model is used to determine if the face information represents a smiling face.
if the result shows "YES", the intelligent robot will output preset facial expression response information;
if the result shows "NO", it will exit.

Specifically, in a preferred embodiment of the present invention, the first recognition model is likewise formed by inputting a plurality of training samples, and the first recognition model is a smiling face recognition model for recognizing whether the face information represents a smiling face. The smiling face recognition model can judge if pieces of the information of the feature points constitute the characteristic of a smiling face according to captured information of various feature points on the human face, so as to recognize whether the human face is the smiling face.

In a preferred embodiment of the present invention, in Step S41, all the information of the feature points predicted by the third recognition model are input into the first recognition model. For example, as described above, information of the 68 feature points predicted is all input into the first recognition model, as input data of the first recognition model. Subsequently, based on these information of the feature points, the first recognition model could make a judgment according to criterions, such as at least one of the followings:

(1) whether information of the feature points shows that the mouth part on the human face is in accordance with a smiling face shape (e.g., a shape of corners of the mouth slightly tilted, or a shape of an opening mouth);
(2) whether information of the feature points shows that the facial risorius area on the human face is in accordance with the smiling face shape (e.g., a shape of muscles gathering and protruding);
(3) whether information of the feature points shows that eyes area on the human face is in accordance with the smiling face shape (e.g., a shape of squinting eyes).

Moreover, the abovementioned criterions may further comprise other characteristics of a smiling face, which are usually observable or obtainable from experimental data, thus, it is not necessary to give details herein.

In a preferred embodiment of the present invention, if the current human face could be estimated to be in accordance with the characteristic of a smiling face according to input of the information of the 68 feature points, the current human face will be considered as the smiling face, and the intelligent robot will output facial expression response information corresponding to a smiling face, based on the result of decision.

In a preferred embodiment of the present invention, the facial expression response information may be selected from at least one of the followings:
a preset emoticon for expressing happy mood, which is displayed through a display device of the intelligent robot; and/or
a preset voice for expressing happy mood, which is played by a voice playing device of the intelligent robot.

Specifically, in a preferred embodiment of the present invention, the emoticon could be an emoticon displayed on a display device (e.g., a display screen) of the intelligent robot, such as characters representation of smiley emoticon, or graphical representation of smiley emoticon directly on the display screen, or other preset emoticon for expressing happy mood.

The voice could be sounds such as preset laughter, or preset voice of pleased tone, or other preset sounds, played by a voice playing device (e.g., a loudspeaker) of the intelligent robot.

In a preferred embodiment, the facial expression response information may further comprise other response information that can be output and sensible for a user, which is unnecessary to be described herein.

In conclusion, the technical solutions of the present invention utilizes different recognition models, wherein, firstly, the face information within the image information captured by the image capture device is identified by a human face detector, secondly, information of a plurality of feature points in the face information is predicted by a feature point predicting model, afterwards, all the information of the feature points are input into a smiling face recognition model, for identifying whether the current face information represents a smiling face: if it represents the smiling face, the intelligent robot will output facial expression response information for expressing happy mood, which could be sensed by the user; if it does not represent the smiling face, the intelligent robot will exit directly. The abovementioned technical solutions can enrich contents in information interaction between the user and the intelligent robot, and improve the usage experience of the user.

In a preferred embodiment of the invention, an intelligent robot is also provided, using the method for response to facial expression as described above.

These embodiments shown above represent only preferred embodiments of the present invention and may therefore not be construed to be limiting. Alternative embodiments that can be contemplated by the person skilled in the art are likewise included in the scope of the present invention.

What is claimed is:

1. A method for response to facial expression, applicable to intelligent robots, which are configured with image capture devices: the method comprises:
    Step S1: the intelligent robot uses the image capture device to capture image information;
    Step S2: the intelligent robot detects if any face information representing human face exists within the image information;
    if the result shows "YES", location information and size information associated with the face information will be obtained, then proceeding to Step S3;
    if the result shows "NO", returning to Step S1;
    Step S3: according to the location information and the size information, information of a plurality of feature points in the face information are predicted and are output;
    the information of the plurality of feature points are respectively associated with various parts of the human face represented by the face information; and
    Step S4: the intelligent robot determines if the face information represents a smiling face according to the information of feature points by using a first recognition model formed in an advance training:
    if the result shows "YES", the intelligent robot will output preset facial expression response information, and exit;
    if the result shows "NO", it will exit.

2. The method for response to facial expression as claimed in claim 1, wherein a second recognition model for detecting the face information is formed in the intelligent robot in an advance training;
    and Step S2 specifically comprises:
    the intelligent robot uses the second recognition model to detect if the face information exists within the image information;
    if the result shows "YES", location information and size information associated with the face information will be obtained, then proceeding to Step S3;
    if the result shows "NO", returning to Step S1.

3. The method for response to facial expression as claimed in claim 1, wherein a third recognition model for predicting the information of feature points is formed in the intelligent robot in an advance training;
    and Step S3 specifically comprises:
    the intelligent robot uses the third recognition model to predict the information of a plurality of feature points in the face information and output the information of plurality of feature points, according to the location information and the size information.

4. The method for response to facial expression as claimed in claim 3, wherein in Step S3, the third recognition model is used to obtain information of the 68 feature points associated with the face information by way of predication.

5. The method for response to facial expression as claimed in claim 1, wherein Step S4 specifically comprises:
    Step S41: all the information of the feature points predicted in Step S3 are input into the first recognition model;
    Step S42: the first recognition model is used to determine if the face information represents a smiling face:
    if the result shows "YES", the intelligent robot will output preset facial expression response information;
    if the result shows "NO", it will exit.

6. The method for response to facial expression as claimed in claim 1, wherein the facial expression response information in Step S4 comprises:
    a preset emoticon for expressing happy mood, which is displayed through a display device of the intelligent robot; and/or
    a preset voice for expressing happy mood, which is played by a voice playing device of the intelligent robot.

7. An intelligent robot, using a method for response to facial expression, applicable to intelligent robots, which are configured with image capture devices; the method comprises:
    Step S1: the intelligent robot uses the image capture device to capture image information;
    Step S2: the intelligent robot detects if any face information representing human face exists within the image information;
    if the result shows "YES", location information and size information associated with the face information will be obtained, then proceeding to Step S3;
    if the result shows "NO", returning to Step S1;
    Step S3: according to the location information and the size information, information of a plurality of feature points in the face information are predicted and are output;
    the information of the plurality of feature points are respectively associated with various parts of the human face represented by the face information; and
    Step S4: the intelligent robot determines if the face information represents a smiling face according to the information of feature points by using a first recognition model formed in an advance training:
    if the result shows "YES", the intelligent robot will output preset facial expression response information, and exit;
    if the result shows "NO", it will exit.

8. The intelligent robot as claimed in claim 7, wherein a second recognition model for detecting the face information is formed in the intelligent robot in an advance training;
    and Step S2 specifically comprises:
    the intelligent robot uses the second recognition model to detect if the face information exists within the image information;
    if the result shows "YES", location information and size information associated with the face information will be obtained, then proceeding to Step S3;
    if the result shows "NO", returning to Step S1.

9. The intelligent robot as claimed in claim 7, wherein a third recognition model for predicting the information of feature points is formed in the intelligent robot in an advance training;
    and Step S3 specifically comprises:
    the intelligent robot uses the third recognition model to predict the information of a plurality of feature points in the face information and output the information of plurality of feature points, according to the location information and the size information.

10. The intelligent robot as claimed in claim 9, wherein in Step S3, the third recognition model is used to obtain information of the 68 feature points associated with the face information by way of predication.

11. The intelligent robot as claimed in claim 7, wherein Step S4 specifically comprises:
   Step S41: all the information of the feature points predicted in Step S3 are input into the first recognition model;
   Step S42: the first recognition model is used to determine if the face information represents a smiling face:
   if the result shows "YES", the intelligent robot will output preset facial expression response information;
   if the result shows "NO", it will exit.

12. The intelligent robot as claimed in claim 7, wherein the facial expression response information in Step S4 comprises:
   a preset emoticon for expressing happy mood, which is displayed through a display device of the intelligent robot; and/or
   a preset voice for expressing happy mood, which is played by a voice playing device of the intelligent robot.

* * * * *